United States Patent [19]

Smith et al.

[11] 4,339,148
[45] Jul. 13, 1982

[54] APPARATUS FOR DETACHABLY CONNECTING A REMOVABLE FRAME TO A VEHICLE FRAME

[76] Inventors: Lloyd K. Smith; James P. Ryan, both of Box 5624, Rome, Ga. 30161

[21] Appl. No.: 166,139

[22] Filed: Jul. 7, 1980

[51] Int. Cl.³ ............................................. B62D 23/00
[52] U.S. Cl. ................................. 296/35.3; 403/328; 105/363; 410/76; 410/77; 410/80
[58] Field of Search ............... 403/328, 324, 323, 325; 410/55, 76, 77, 80, 81, 84; 296/35.1, 35.3

[56] References Cited

U.S. PATENT DOCUMENTS

| | | | |
|---|---|---|---|
| 2,662,712 | 12/1953 | Rose | 403/324 X |
| 2,675,257 | 4/1954 | Specht | 403/328 |
| 3,163,129 | 12/1964 | Guthridge | 410/54 |
| 3,486,787 | 12/1969 | Campbell | 410/80 |
| 4,113,221 | 9/1978 | Wehner | 403/328 X |

*Primary Examiner*—Wayne L. Shedd
*Attorney, Agent, or Firm*—Woodford R. Thompson, Jr.

[57] ABSTRACT

A removable frame is detachably connected to a supporting frame by a connection having a plurality of spaced apart vertically extending sleeve-like members mounted on the removable frame. Upwardly projecting members are mounted at the periphery of the supporting frame and telescope into each of the sleeve-like members. A horizontal tubular housing attached to each sleeve-like member carries a locking element which cooperates with its upwardly projecting member to form a positively locked connection between the removable and supporting frame.

1 Claim, 5 Drawing Figures

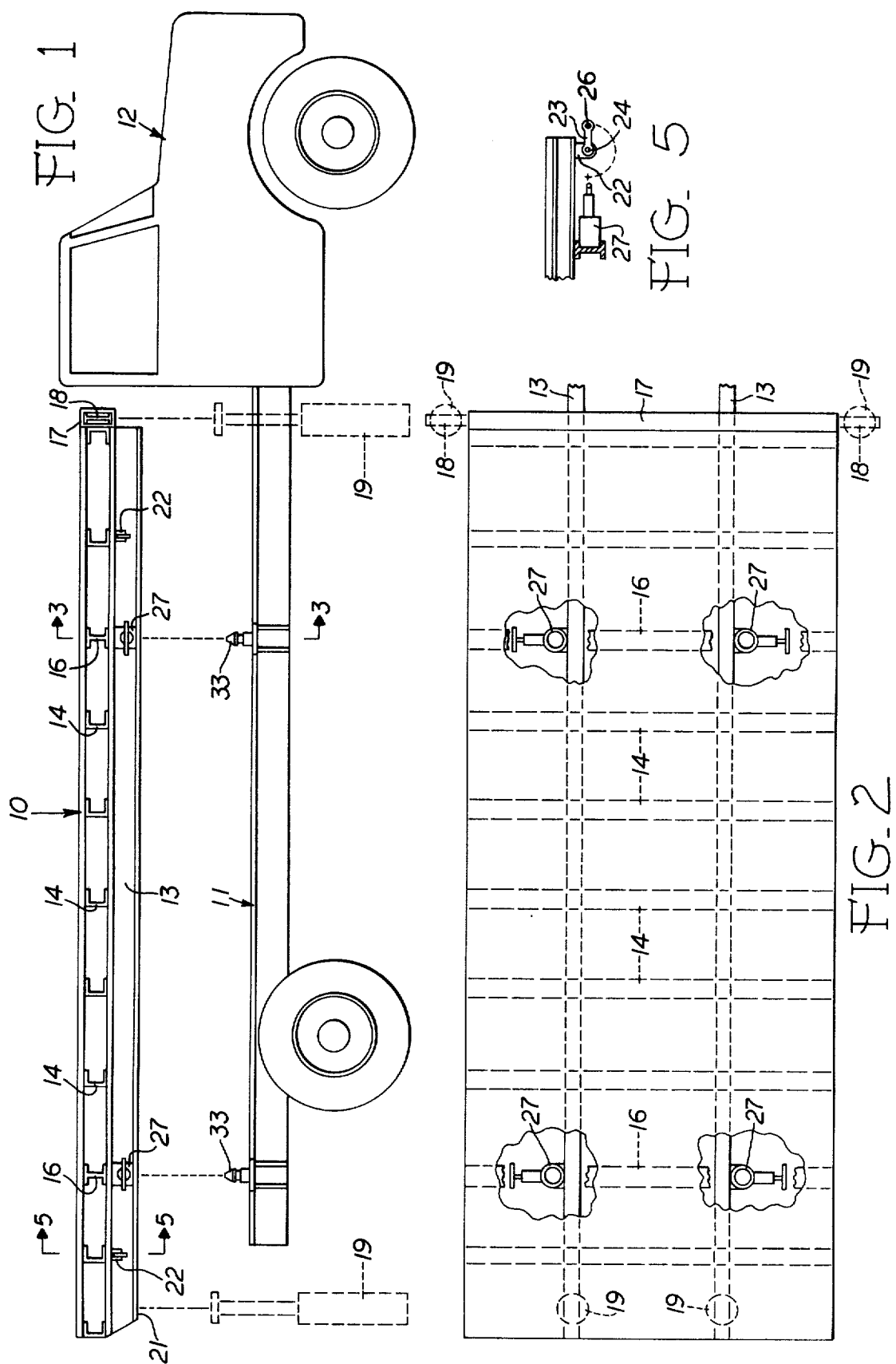

APPARATUS FOR DETACHABLY CONNECTING A REMOVABLE FRAME TO A VEHICLE FRAME

BACKGROUND OF THE INVENTION

This invention relates to an apparatus for detachably connecting a removable frame to a supporting frame of a vehicle and more particularly to an apparatus for detachably connecting a removable frame to a supporting frame of a conventional truck or the like.

As is well known in the art to which my invention relates, many devices have been devised to detachably connect removable frames to supporting frames. Difficulties have been encountered with these devices due to the fact that they require a substantial amount of time and effort to connect and disconnect the removable frame and the supporting frame. Also, such prior art devices do not have a positive detachable connection between frames.

SUMMARY OF THE INVENTION

In accordance with my invention, I overcome the above and other difficulties by providing a detachable connecting apparatus which is simple of construction and manufacture and requires a minimum effort for operation in a quick and easy manner. An effective positive detachable connection is also provided between the removable frame and supporting frame whereby a safe connection is maintained at all times. My improved apparatus includes a plurality of spaced apart, vertically extending sleeve-like members mounted on the removable frame. An upwardly projecting member is mounted on the supporting frame in position to telescope into each of the sleeve-like members. A releasable locking element operatively connects each sleeve-like member to its upwardly projecting member to provide a quick connection therebetween.

DESCRIPTION OF THE DRAWINGS

Apparatus embodying features of my invention is illustrated in the accompanying drawings, forming a part of this application, in which:

FIG. 1 is a side elevational view showing the removable frame detached from the supporting frame of a conventional truck;

FIG. 2 is a plan view of the apparatus shown in FIG. 1 with portions of the frame omitted to show the detachable connector apparatus;

DETAILED DESCRIPTION

Figure 3:
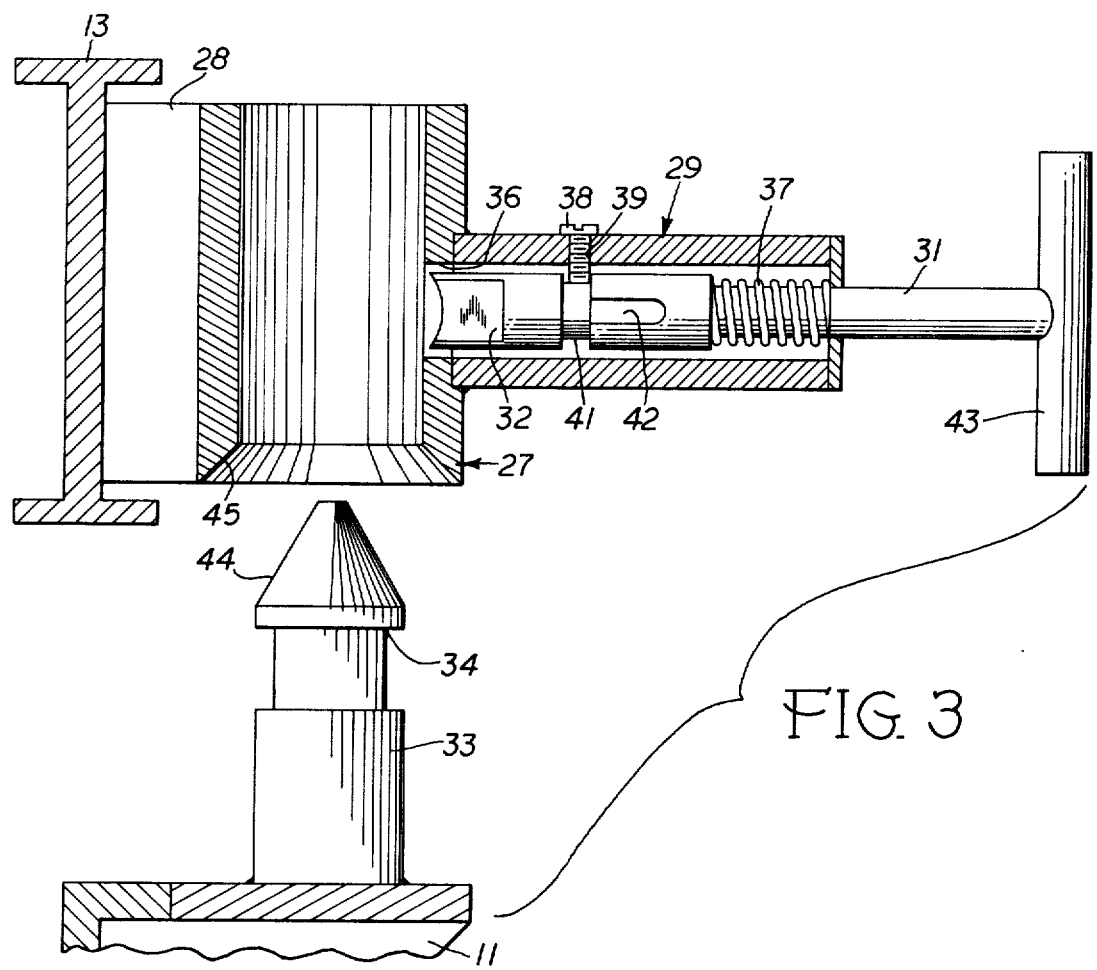
FIG. 3 is a fragmented sectional view taken along line 3—3 of FIG. 1 showing the detachable connector in the separated position.

Referring now to the drawings for a better understanding of my invention, I show in FIG. 1 a removable frame 10 and a supporting frame 11 mounted on a conventional truck 12. The removable frame 10 may be in the form of elongated I-beams 13 connected to each other and held in spaced relation to each other by transverse channels 14 and transverse I-beams 16. A tubular member 17 is mounted on the forwardmost channel 14 for receiving a pair of outwardly extending telescoping support members 18 which are engaged by conventional lifting jacks 19 to elevate the front of the removable frame 10, as shown in FIG. 1. Engaging the under surface 21 of the elongated I-beams 13, at the rear of removable frame 10, are conventional lifting jacks 19 which elevate the rear of the removable frame 10, as shown in FIG. 1. The I-beams and channels are secured to each other by suitable means, such as by welding.

Depending brackets 22 are secured to the lower surfaces of the transverse channels 12 adjacent the front and rear of the removable frame 10, as shown in FIGS. 1 and 5. One end of a link member 23 is pivotally connected to each depending bracket 22 by suitable means, such as by a retaining pin 24. The other end of the link member 23 is provided with an eyelet 26 for receiving a lifting hook of a conventional lifting crane or the like.

Figure 4:
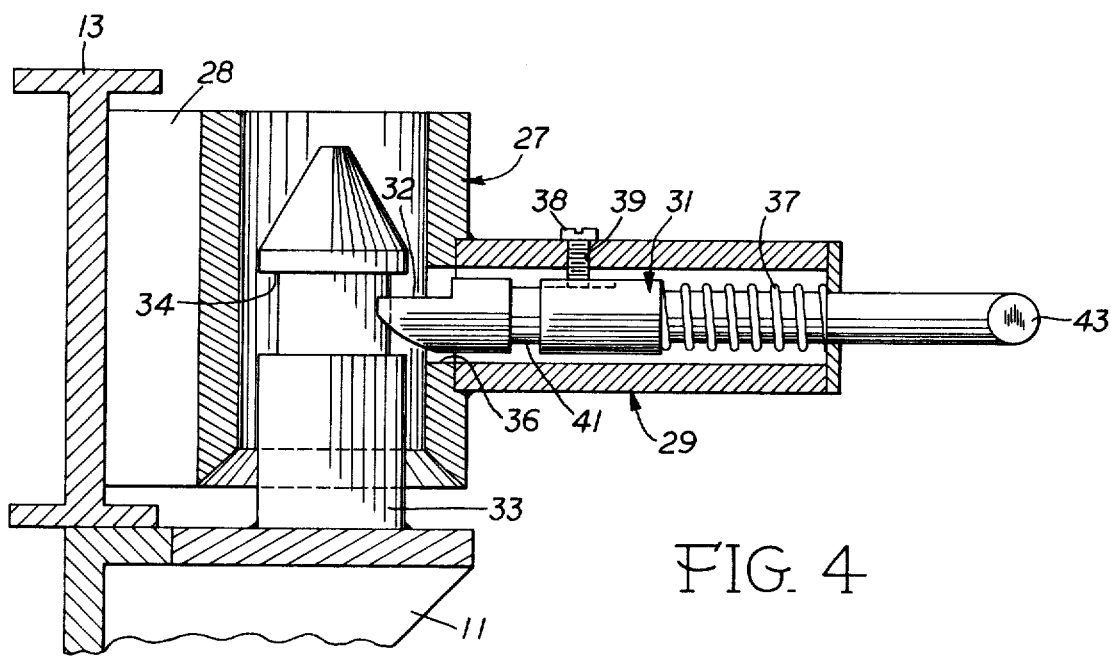
FIG. 4 is a fragmented sectional view corresponding to FIG. 3 showing the detachable connector in the connected position; and, FIG. 5 is a fragmented sectional view taken generally along line 5—5 of FIG. 1

A plurality of spaced apart vertically extending sleeve-like members 27 are secured to spacer brackets 28 which in turn are mounted on the I-beams 13 by suitable means, such as by welding, as shown in FIGS. 3 and 4. A horizontal tubular housing 29 is mounted at the outer side of each sleeve-like member 27, as shown. A locking element 31 having a notch 32 adjacent one end thereof is mounted for axial movement in each tubular housing 29.

An upwardly projecting member 33 having a recess 34 therein is secured to the supporting frame 11, such as by welding, in position to telescope into each of the sleeve-like members 27. A passageway 36 extends through each sleeve-like member 27 and is in axial alignment with the tubular housing 29. Passageway 36 allows the locking element 31 to move to its innermost position in the sleeve-like member 27 with the upper surface of the notch 32 in position to pass beneath the uppermost wall of the recess 34 in the upwardly projecting member 33, as shown in FIG. 4. Resilient means, such as a compression spring 37, is operatively connected to the locking element 31 in position to urge it inwardly of the sleeve-like member 27 to thus create a positive connection between the removable frame 10 and the supporting frame 11.

A releasable locking member, such as a pin-like member 38, extends through an opening 39 in each horizontal tubular housing 29 in position to engage an annular recess 41 in the locking element 31, thus retaining it in the outermost position, as shown in FIG. 3. An axially extending slot 42 is provided in the locking element 31 with one end thereof in communication with the annular recess 41 for receiving the pin-like member 38 when the locking element 31 is moved to its innermost position relative to the sleeve-like member 27, as shown in FIG. 4. A suitable handle 43 is carried by the outer end of the locking element 31 whereby it may be rotated to align the slot 42 with the pin-like member 38 thus permitting the locking element 31 to be moved to its innermost position.

The upper end of the upwardly projecting member 33 is tapered as at 44, as shown. The lower end of the sleeve-like member 27 flares outwardly and downwardly as at 45 to facilitate receiving the tapered upper end 44 of the upwardly projecting element 33.

From the foregoing description, the operation of my improved apparatus for detachably connecting a removable frame to a supporting frame of a vehicle will be readily understood. FIG. 4 shows the apparatus in the connected position with the pin-like member 38 firmly engaging the axially extending slot 42 in the locking element 31. To disconnect the apparatus, locking element 31 is pulled outwardly by means of the handle 43 until pin-like member 38 engages the annular recess 41. The locking element 31 is then rotated until the pin-like member 38 engages the annular recess 41 thus positively locking the locking element 31 in its outermost position. As shown in FIG. 3, a positive lock is thus provided due to the fact that the pin-like member 38 engages an adjacent side wall of the annular recess 41, thus limiting axial movement of the locking element 31.

After positioning the locking element 31 in the outermost locked position, lifting hooks of a conventional lifting crane may be placed in the eyelet 26 of each link member 23, as shown in FIGS. 1, 2 and 5. The removable frame 10 is now in position to be elevated from the supporting frame 11. Also, the support members 18 may serve as an alternate method of elevating and supporting removable frame 10. The support members 18 extend outwardly of the ends of the tubular member 17 to engage conventional lifting jacks 19 which raise the front of the removable frame 10. The lifting jacks 19 engage the under surface 21 of the elongated I-beams 13 to elevate the rear end of the removable frame 10 as shown in FIG. 1.

In connecting the removable frame 10 to the supporting frame 11 the steps depicted above would be reversed. The removable frame 10 would be lowered by using either the conventional lifting jacks 19 or the lifting crane mentioned above. Each upwardly projecting member 33 telescopes into its corresponding sleeve-like member 27 as the removable frame 10 is lowered onto the supporting frame 11. With the locking element 31 in the outermost position, as shown in FIG. 3, it would then be rotated until the pin-like member 38 aligns with the axially extending slot 42. The locking element 31 would then be urged to its innermost position in sleeve-like member 27 as shown in FIG. 4, thus providing a positive lock between the connected frames.

From the foregoing, it will be seen that I have devised an improved apparatus which is sturdy of construction and which may be quickly and easily connected or disconnected. Also, I provide apparatus which positively locks the removable frame to the supporting frame thus eliminating separation of the connected frames. Furthermore, my apparatus prevents improper installation and is operative by exerting a minimum of effort to selectively connect and disconnect the frames.

While I have shown my invention in but one form, it will be obvious to those skilled in the art that it is not so limited, but is susceptible of various changes and modifications without departing from the spirit thereof.

What I claim is:

1. Apparatus for detachably connecting a removable frame to a supporting frame of a vehicle which comprises:
   (a) a plurality of spaced apart, vertically extending sleeve-like members mounted on said removable frame with the lower ends of said sleeve-like members being beveled to provide downwardly and outwardly flaring lower end portions,
   (b) an upwardly projecting member having a tapered upper end portion mounted on said supporting frame in position to telescope into the downwardly and outwardly flaring lower end portion of each of said sleeve-like members,
   (c) a horizontal tubular housing mounted on one side of each said sleeve-like member and projecting outwardly thereof,
   (d) a passageway through each said sleeve-like member in axial alignment with said tubular housing,
   (e) a locking element having an annular recess therein mounted for axial movement in said tubular housing selectively from a first position outwardly of said sleeve-like member to a second position inwardly of said sleeve-like member;
   (f) a recess in said upwardly projectng member in alignment with said passageway with the uppermost wall of said recess in position to receive a notch provided at the inner end of said locking element upon movement of said locking element to said second position,
   (g) a compression spring urging said locking element toward said second position and into engagement with said recess in said upwardly projecting member,
   (h) there being an opening through one side of said horizontal tubular housing in alignment with said annular recess in said locking element when said locking element is in said first position,
   (i) a pin-like member extending through said opening in position to engage said annular recess and positively retain said locking element in said first position,
   (j) an axially extending slot in said locking element having one end thereof communicating with said annular recess and receiving said pin-like member upon movement of said locking element to said second position, and
   (k) a handle carried by the outer end of said locking element for selectively imparting axial and rotary motion thereto.

* * * * *